United States Patent [19]

Aberle

[11] Patent Number: 5,618,078
[45] Date of Patent: Apr. 8, 1997

[54] STAKE POCKET HOLDER

[76] Inventor: Steven C. Aberle, 6635 Braun Ct., Arvada, Colo. 80004

[21] Appl. No.: 319,317

[22] Filed: Oct. 6, 1994

[51] Int. Cl.⁶ .................................................... B60P 7/06
[52] U.S. Cl. ........................... 296/43; 105/390; 248/539; 410/102
[58] Field of Search ..................... 296/43, 3; 248/539, 248/534, 511, 523, 310, 314; 410/102, 106, 116, 153, 107, 108, 109, 110; 105/390, 380

[56] References Cited

U.S. PATENT DOCUMENTS

| | | | |
|---|---|---|---|
| 515,796 | 3/1894 | Schurmeier | 105/390 |
| 1,506,476 | 8/1924 | Cullinan | 296/43 |
| 1,507,229 | 9/1924 | Bosley | 296/43 |
| 3,295,802 | 1/1967 | Leatherman | 248/523 |
| 3,595,452 | 7/1971 | Anderson | 296/43 X |
| 3,664,617 | 5/1972 | Fenwick | 248/314 X |

FOREIGN PATENT DOCUMENTS 115007 9/1945 Sweden ................................ 296/43

*Primary Examiner*—David M. Mitchell
*Assistant Examiner*—Kia M. Robinson
*Attorney, Agent, or Firm*—John L. Isaac

[57] ABSTRACT

A pocket stake holder is disclosed having a pocket adapted for mounting an elongated stake of substantially square or circular cross-section to a frame. The pocket stake holder includes a homing having a front member and a pair of side members that have front and back edges. The front member and side members are interconnected along the front edges of the side members to define a U-channel of substantially square cross-section to form the pocket and which includes an open back side, an upper channel opening and a lower channel opening. A pair of flanges are disposed along the back edges of the side members and include a mechanism to enable removable mounting of the flanges and the housing against a surface in order to close the open back side. Finally, a device is disposed at the lower channel opening to prevent passage of a stake therethrough while permitting fluid flow through the channel.

22 Claims, 4 Drawing Sheets

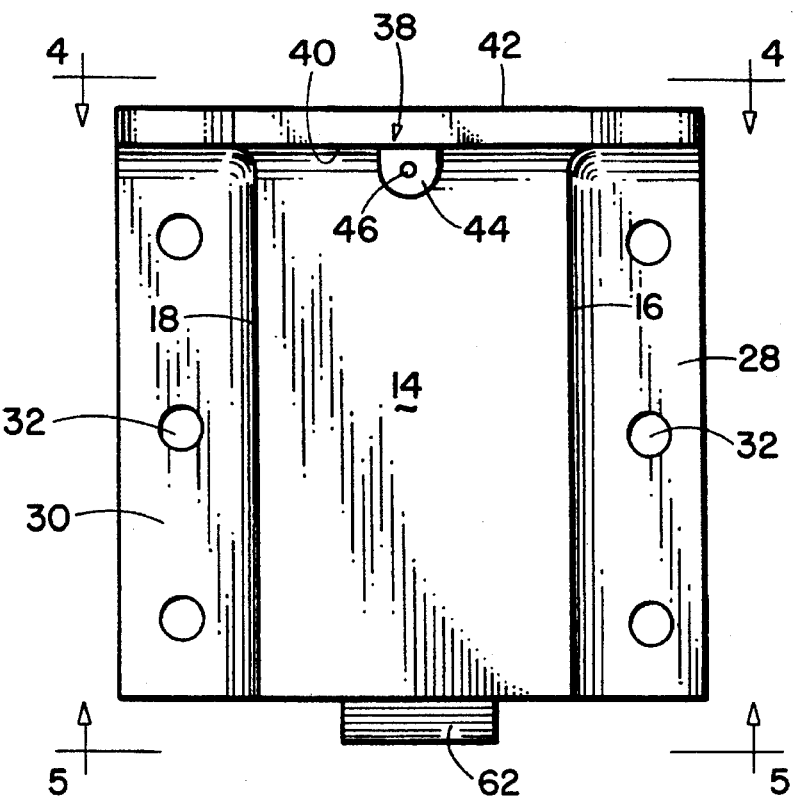
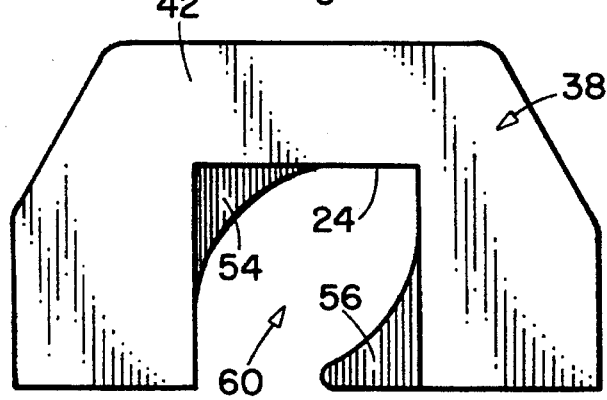
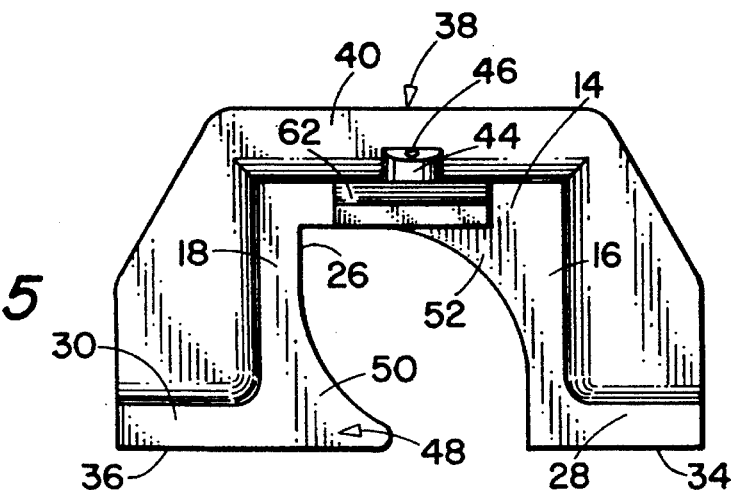

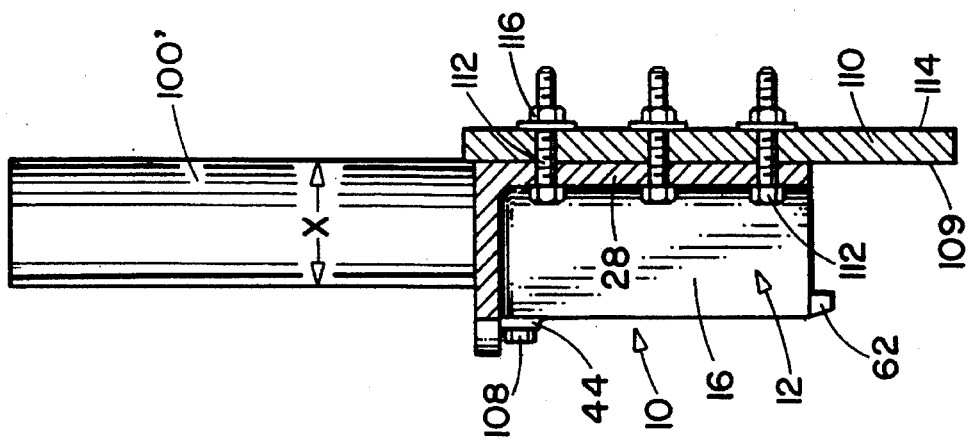
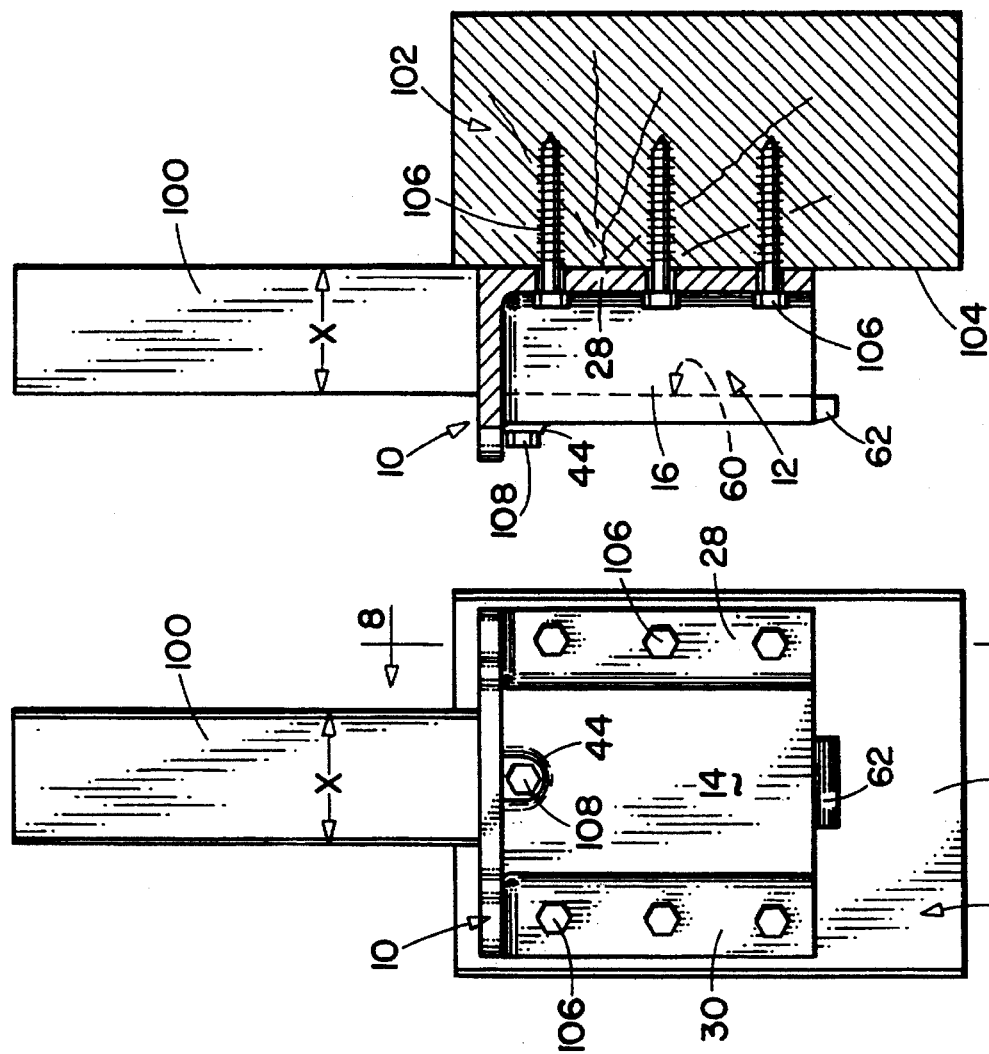

5,618,078

STAKE POCKET HOLDER

BACKGROUND OF THE INVENTION

1. Field of the Invention

This invention relates generally to systems designed to hold stakes for use with flat bed vehicle bodies and, more particularly, to stake pockets useful for removably mounting stakes in such environments. Specifically, the present invention relates to an improved stake pocket holder adapted to fit stakes of differing shapes and in securing stakes in a wide variety of applications.

2. Description of the Prior Art

Stake pocket devices have long been used to mount and support stakes along the bed of a vehicle. Vehicles having open, unenclosed areas to accommodate loads of varying types and configurations are quite common. Examples of such vehicles include flat bed trucks, flat bed railroad cars, and even non-motorized horse-drawn wagons. Frequently, such vehicles have a rectangular bed which include a number of stake-receiving pockets positioned about the perimeter thereof. The stakes are elongated members positioned within the peripherally disposed stake pockets and are provided to restrain the load placed on the vehicle bed in the event the load shifts, and to prevent it from falling off the bed. In alternate embodiments, panels can be attached between the stakes to define sidewalls which serve to further contain the load being carried. Such panels are generally held in position by slots which are usually integral with and carried by the stakes, and into which the side ends of the panels fit.

U.S. Pat. Nos. 351,246, 623,042 and 1,436,513 illustrate early stake pocket designs utilized on flat bed vehicles and wagons. In such instances, the stakes were often rectangular in cross-sectional shape and individually sized to fit a particular stake pocket. Because of the wide variation in pocket sizes, a large number of individually sized stakes were required to fit the various different pockets. Consequently, devices were created to permit stake pockets to be adaptable to various size stakes such as illustrated in U.S. Pat. Nos. 2,140,074, 3,764,177 and 4,427,230. Another alternate approach to the problem was to devise an entire vehicle bed with the stake pockets designed right into the bed such as disclosed in U.S. Pat. No. 1,454,037. In virtually all of these instances, the stake pockets were generally rectangular in shape and, as previously indicated, of varying size. Moreover, the stake pockets were generally permanently mounted by bolting or welding.

In recent years, it has been highly desirable to produce stakes and stake pocket designs that are more uniform in size and shape. In many instances, it is desirable to utilize a stake which is annular in cross-section and, because of the above described prior art, are unfortunately not adaptable to the stake pockets presently on the market. Thus, there is still a strong need to create a stake pocket which is easily and removably mountable to a flat bed vehicle or other surface wherein stakes or posts are needed to be provided in a firm yet removable manner.

SUMMARY OF THE INVENTION

Accordingly, it is one object of the present invention to provide an improved stake pocket holder that is removably mountable to a wide variety of different types of surfaces.

It is another object of the present invention to provide a stake pocket holder of improved design that is adaptable to receive stakes having square or annular cross-sections.

Yet another object of the present invention is to provide a stake pocket holder that is a unitary cast member.

Still a further object of the present invention is to provide a stake pocket holder that is designed to hold stakes useful not only in flat bed vehicles but also as posts for railings, hand rails, trailers and the like, which stake pocket holders are removable.

According to the above and other objects and advantages of the present invention, a stake pocket holder is disclosed having a pocket adapted for mounting an elongated stake of substantially square or circular cross-section to a frame. The stake pocket holder includes a housing having a front member and a pair of side members that have front and back edges. The front member and side members are interconnected along the front edges of the side members to define a U-channel of substantially square cross-section to form the pocket and which includes an open back side, an upper channel opening and a lower channel opening. A pair of flanges are disposed along the back edges of the side members and include a mechanism to enable removable mounting of the flanges and the housing against a surface in order to close the open back side. Finally, a device is disposed at the lower channel opening to prevent passage of a stake therethrough while permitting fluid flow through the channel.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings:

FIG. 3 is a front plan view of the stake pocket holder illustrated in FIG. 1;

FIG. 4 is a top plan view of the stake pocket holder illustrated in FIG. 3 and taken substantially along line 4—4 of FIG. 3;

FIG. 5 is a bottom plan view of the stake pocket holder illustrated in FIG. 3 and taken substantially along line 5—5 of FIG. 3;

FIG. 7 is a front plan view of the stake pocket holder constructed in accordance with the present invention and illustrating the holder secured to a frame surface and having a stake positioned therewithin;

FIG. 8 is a cross-sectional view of the stake pocket holder illustrated in FIG. 7 and taken substantially along line 8—8 of FIG. 7; and FIG. 9 is another cross-sectional view of the stake pocket holder with an inserted stake similar to that of FIG. 8 but illustrating the holder attached to a metal surface.

DETAILED DESCRIPTION OF THE PREFERRED EMBODIMENTS

Figure 1:
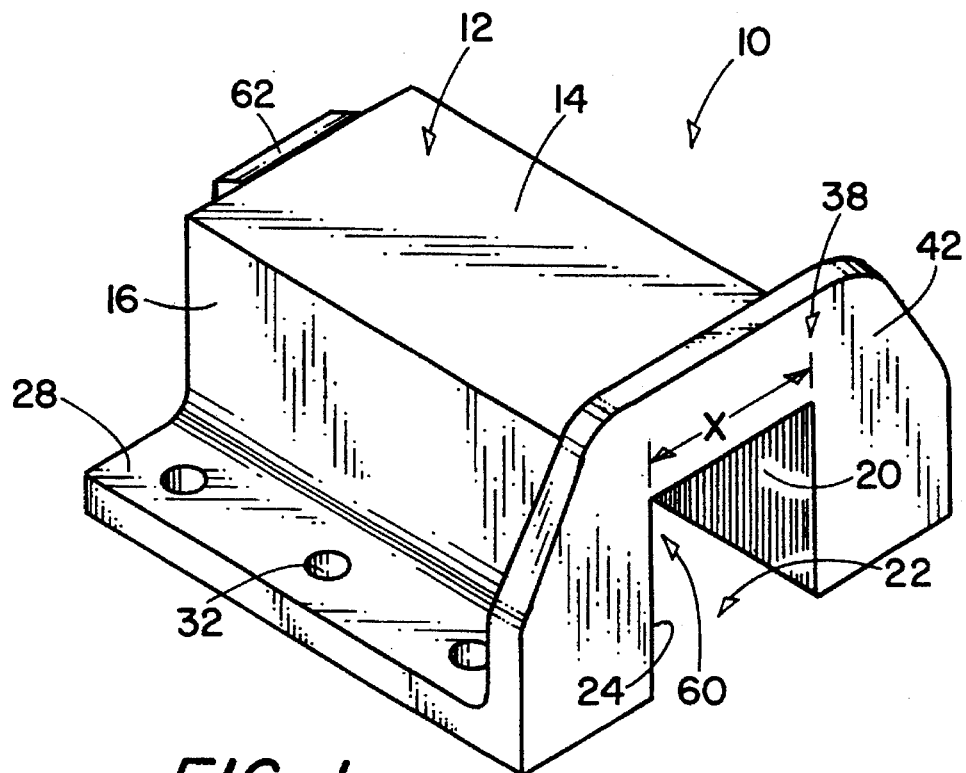
FIG. 1 is a top perspective view of the stake pocket holder constructed in accordance with the present invention.
Figure 2:
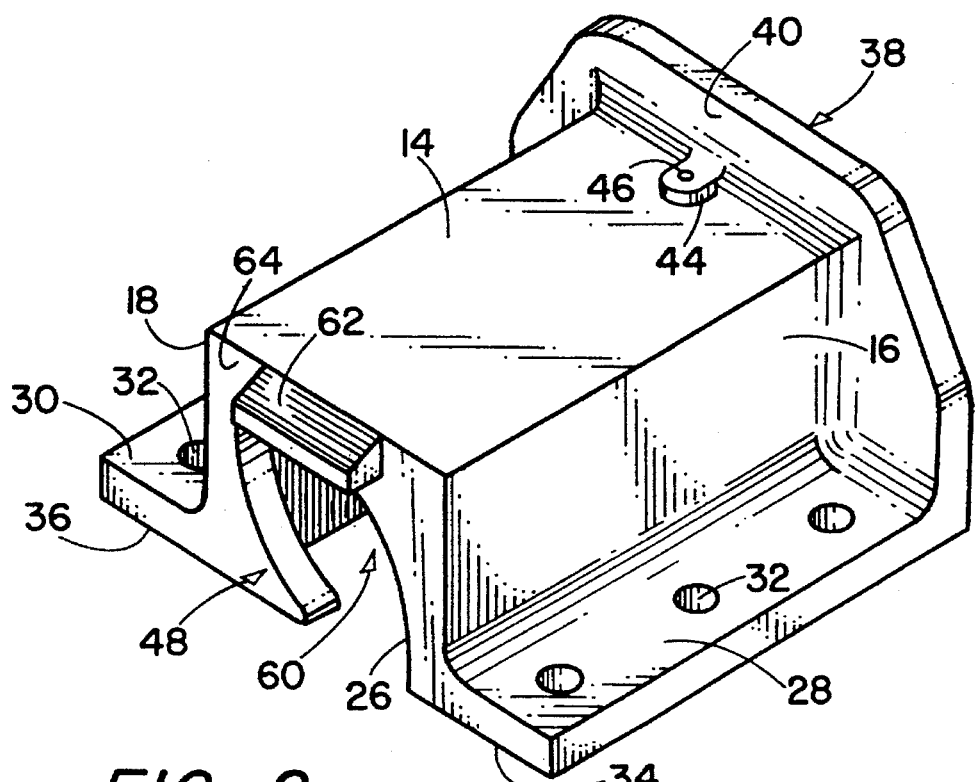
FIG. 2 is a bottom perspective view of the stake pocket holder illustrated in FIG. 1.

Prior stake pocket holders have generally been designed to receive specifically sized and shaped stakes which have generally been rectangular in cross-section. Heretofore, there has not been a universal-type of stake pocket holder designed to receive both square as well as annular-shaped stakes. Moreover, such universal-type stake pockets as in the present invention can be utilized for more than flat bed trailers and other vehicles which have been the traditional application for stake pockets. The stake pocket holder of the present invention can be used to provide a base for poles for a railing, to provide a base for gate hinges on the side of a building, to provide for highway guard railings, and the like.

Referring more particularly to FIGS. 1–5, a stake pocket device or holder 10 is disclosed. The holder 10 is preferably in the form of a housing 12 having a front plate 14 and a pair of side plates 16, 18 interconnected to the front plate 14 preferably at substantially right angles. The plates 14, 16 and 18 define an interior U-channel 20 that includes an open back side 22, an upper channel opening 24 and a lower channel opening 26.

In order to attach the holder 10 to a frame or surface, the housing 12 further includes a pair of flange members 28, 30 which are secured to and extend outwardly from the rear or back edges of the side plates 16, 18, respectively. The flanges 28, 30 have a plurality of apertures 32 disposed along their length in order to permit attachment members, described below, to be utilized to attach the rear faces 34, 36 of the flanges 28, 30 against a surface thereby attaching a device 10 to a surface as discussed in greater detail below.

A top plate 38 interconnects the upper edges of the front plate 14, the side plates 16, 18, and the flanges 28, 30 to provide a ledge or overhang 40 which projects outwardly therefrom. The top plate 38 provides substantial reinforcement strength against lateral stress occasionally imposed on the housing 12 by a stake positioned therewithin. The top plate 38 also provides an upper surface 42 for support purposes as well as for defining the upper channel opening 24. In the illustrated embodiment, the upper channel opening 24 is substantially square having a cross-section width X which is preferably coaligned with the U-channel 20 which also has a substantially square cross-section having a width dimension X as well. In preferred form, a boss 44 is disposed along the bottom of the ledge 40 at the upper portion of the front plate 14 and includes a threaded aperture 46 which passes through the entire boss 44 and the front plate 14. The boss 44 with aperture 46 provides a mechanism whereby a threaded attachment member, as disclosed below, may be utilized to secure a stake positioned within the U-channel 20.

A restricting mechanism 48 is provided at the lower portion of the U-channel 20 in the area which defines the lower channel opening 26. The restricting mechanism 48 is designed to restrict the size and alter the shape of the opening 26 relative to the cross-sectional shape of the U-channel 20. In preferred form, a pair of ledges or stops 50, 52 are disposed on diagonally opposite corners of the U-channel 20 at the lower opening 26 thereof to provide a generally elliptical or football shaped opening 26. In this manner, a shelf 54, 56 is provided at the lower opening 26 upon which a stake having either a circular or a square cross-section may rest in order to prevent passage of the stake through the lower opening 26. In this manner, a pocket 60 is provided for receiving a stake which may be substantially square in cross-section having a width dimension substantially equal to the width dimension X of the U-channel 20, or circular in shape having a diameter substantially equal to the cross-sectional dimension X of the U-channel 20. In either instance, the stake may be placed within the pocket 60 and held therein by the shelves 54, 56, the walls of the U-channel 20 and the attachment mechanism utilized with the boss 44 as described in greater detail below. In preferred form, the width dimension X may vary from 1–2.5 inches and, most preferred, is approximately 2 inches.

An additional member 62 is preferably disposed on the lower portion of the housing 12 and is preferably in the form of a lip projecting downwardly from the bottom edge 64 of the front plate 14. The member or lip 62 provides a device around which tie-downs or ropes may be utilized to further secure a stake within the pocket 60 or for use in conjunction with other devices attached to the stake.

In preferred form, the housing 12 is unitary in construction and is preferably cast from steel or aluminum. This preferred unitary construction includes the ledges 50, 52 formed at diagonally opposite corners of the U-channel 20 proximate the bottom opening 26. In this matter, the device 10 is provided with minimum clearances and variances due to its casting nature. Moreover, if aluminum rather than steel is utilized, rust or corrosion can be prevented should the devices 10 be exposed to the outdoor elements. In less strenuous applications, the homing 12 can be molded from plastic or other materials having less strength than casted steel or aluminum. However, when the housing 12 was casted from steel, the device 10 withstood 40,000 psi of lateral pressure exerted against its ledge 38 by a test stake positioned therewithin without failure or even deformation of the housing 12.

Figure 6:
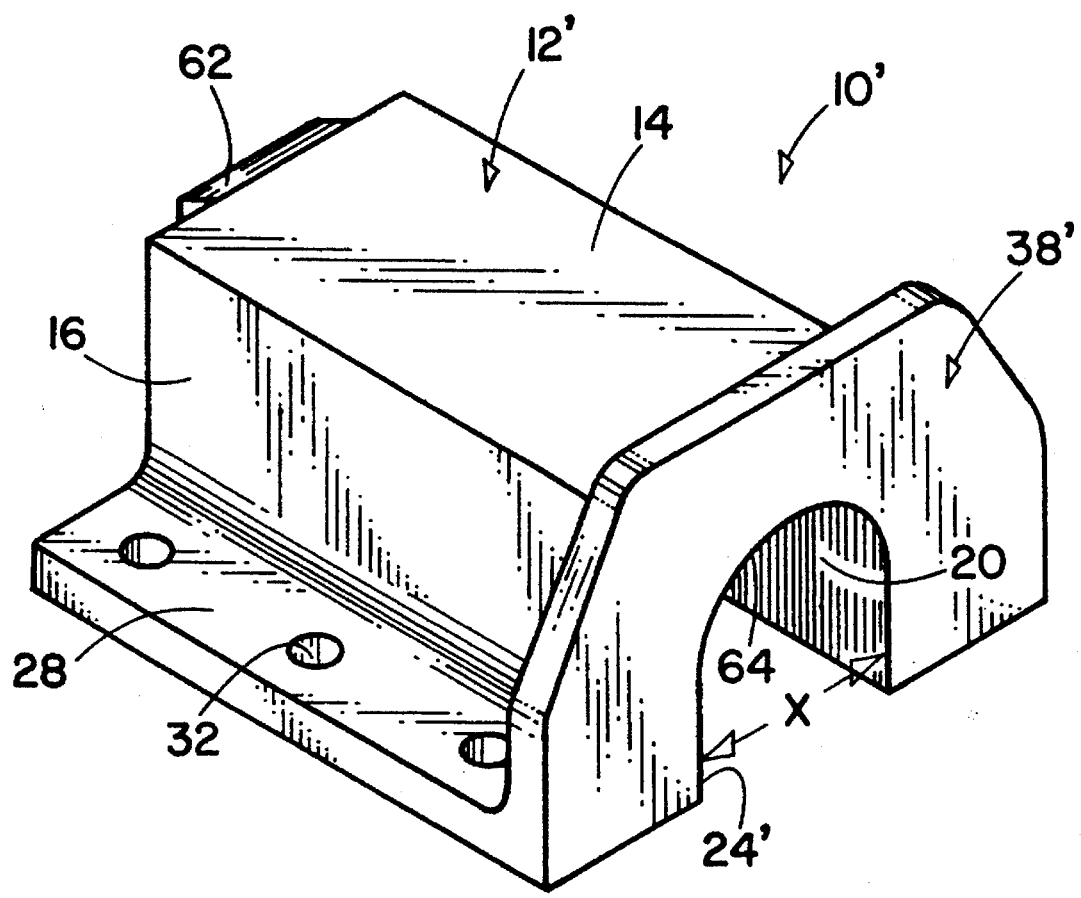
FIG. 6 is a top perspective view of an alternate embodiment of the stake pocket holder of the present invention.

Referring now to FIG. 6, an alternate embodiment of the present invention is disclosed wherein the device 10' includes a housing 12' constructed substantially as in the previous embodiment. The difference between the embodiment illustrated in FIG. 6 and the previous embodiment is in the construction of the top plate 38' which defines the upper channel opening 24' in a shape more specific to receive annular stakes. In this embodiment, the upper opening 24' includes a semi-circular portion 64 that has a diameter equal to the width dimension X of the U-channel 20. In this manner, an annular stake having a diameter X is more firmly held in position by the top plate 38' as compared to the prior embodiment, although an annular stake having a diameter X would also be readily received and fit within the pocket 60 of the embodiment illustrated in FIGS. 1–5.

Referring now to FIGS. 7–8, the device 10 is utilized to hold a stake 100 relative to a frame or wall 102 by attaching the device 10 to the surface 104 of the frame 102. In the illustrated embodiment, a plurality of screws 106 are utilized as attachment members to secure the flanges 28, 30 by way of apertures 32 against the front surface 104. As can be seen from FIGS. 7 and 8, the device 10 is secured firmly against the surface 104 by the attachment screws 106 to close off the open back side 22 of the U-channel 20 in order to form an enclosed pocket 60. Once this is accomplished, the stake 100, being either substantially square having a cross-sectional dimension X or circular having a diameter X, is dropped into the pocket 60 until it rests against the shelves 54, 56 as illustrated in FIG. 4. At this point, a set screw or other tightening member 108 is threadably engaged within the aperture 46 of the boss 44 until it tightens against the outer surface of the stake 100 within the pocket 60. The set screw 108 is utilized to firmly fix the stake 100 within the pocket 60 of the holder 10 in removable fashion.

In yet another alternate attachment embodiment as illustrated in FIG. 9, the device or holder 10 of the present invention may be secured to the front surface 109 of a metal plate or other thin substrate member 110 by utilizing attachment bolts 112 passing through the apertures 32 of the flanges 28, 30. The bolts 112 are tightened against the outer surface 114 of the plate 110 by the nut members 116. The stake 100 is then set within the holder 10 as in the previously described embodiments.

The stake holder 10 of the present invention is designed to provide a firm mounting structure in a removable fashion for a stake of either square cross-section or circular cross-section. However, the holder 10 itself is desired for removable attachment to a wide variety of surfaces as well as providing for removably affixing the stake 100 within the holder 10. The holder 10 is designed to allow fluids such as water and snow melt as well as dirt and other debris to pass through the U-channel 20 without accumulating therein while preventing passing of the stake through the bottom channel opening 26. Thus, the holder 10 can remain substantially free of debris and liquid which can normally accumulate in an outside environment without compromising the firm attachment of the stake.

The stake pocket device or holder 10 of the present invention may be attached to any type of frame or surface including concrete, wood, brick, steel or the like. It may be utilized in traditional fashion as a stake holder along the edges of flat bed vehicles for holding stakes which in turn act as attachment members for panels to restrict the movement of materials on the flat bed track. In addition, however, the present invention may also be utilized as a holder for tubular support posts for railings for fences, hand rails along walkways, and guard rails along highways. Due to the ready removability of the present invention, such fences or guard rails incorporating the invention may be temporary structures for emergency purposes which provide the strength and security typically reserved for permanent structures.

The present invention may also be utilized in a unique fashion as a hinge mechanism by providing two holders 10 oriented opposite each other with one secured to the top of a pipe and the other secured to the bottom of the pipe, the two holders then being attached to the side of a home or other building structure. In this manner, a circular pipe may be readily mounted to the side of a building in removable fashion which pipe may then be utilized as a hinge member of a gate. Thus, the diversity of use of the present invention is due to its ability to allow fluid flow through the U-channel without limiting stake fixing capability as well as to receive both square as well as annular stakes. Moreover, the removability factor of the device of the present invention both as to the surface to which the device is attached as well as the ability to removably affix stakes within the device provides for a diversity of uses previously unavailable in stake pocket devices.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art.

I claim:

1. A stake holder having a pocket adapted for mounting an elongated stake of substantially square or circular cross-section to a frame, said stake holder comprising:

a housing having a front member and a pair of side members having front and back edges, said front member being interconnected along said side member front edges to define a U-channel of substantially square cross-section to form said pocket and having an open back side, an upper channel opening and a lower channel opening;

a pair of flanges disposed along the back edges of said side members and including means to enable removable mounting of said flanges and said housing against a surface to close said open back side;

a pair of ledge members disposed at diagonally opposite corners of said lower channel opening to prevent the passage of said stake therethrough while permitting fluid flow through said channel; and said holder being in the form of a unitary cast member.

2. The stake holder as claimed in claim 1, wherein said substantially square cross-section is approximately 2 inches square adapted to receive 1.5–2 inch square stakes and approximately 2 inch diameter annular stakes.

3. The stake holder as claimed in claim 1, wherein said stake holder further comprises a top plate interconnecting said front member, said side members and said flanges at their upper edges to define said upper channel opening and form a support ledge projecting outwardly from said housing.

4. The stake holder as claimed in claim 3, wherein said top plate defines a substantially square upper channel opening coaligned with said U-channel pocket cross-section.

5. The stake holder as claimed in claim 3, wherein said top plate defines an annular upper channel opening having a diameter substantially equal to the width dimension of said substantially square U-channel.

6. The stake holder as claimed in claim 1, wherein said holder further comprises a lip projecting downwardly from the lower edge of said front member without interfering with said lower channel opening.

7. The stake holder as claimed in claim 1, if wherein said housing further includes a boss disposed along the upper portion of said from member and including a threaded aperture passing therethrough accessing said U-channel, said boss and aperture being sized and shaped to receive means for removably fixing a stake within said U-channel.

8. The stake holder as claimed in claim 1, wherein said pair of ledge members define an elliptically shaped lower channel opening.

9. The stake holder as claimed in claim 1, wherein said holder is cast metal.

10. A stake pocket device for vertically and removably mounting elongated stakes of rectangular or annular cross-section, said pocket device comprising:

an elongated frame having front and side portions forming an interior U-channel of substantially square cross-section and defining an open back side, an upper channel opening and a lower channel opening;

means to enable attachment of said frame to a surface to close said back side opening and form an enclosed channel of substantially square cross-section;

means disposed at said upper channel opening to size and shape said upper channel opening to receive said stake; and a pair of ledge members disposed at diagonally opposite corners of said lower channel opening restricting the size thereof to less than the cross-section of said channel to permit fluid flow through said lower channel opening while providing a seat for said stake to prevent passage of said stake therethrough.

11. The pocket device as claimed in claim 10, wherein said device further includes means for releasably securing said stake within said U-channel.

12. The pocket device as claimed in claim 11, wherein said stake securing means comprises a boss disposed on said front portion defining a threaded aperture therewithin, and tightening means sized and shaped for adjustable passage through said aperture to releasably fix said stake within said frame.

13. The pocket device as claimed in claim 10, wherein said frame attachment means comprises a pair of flanges secured to said side portions and including a plurality of apertures disposed therewithin to permit attachment of said flanges to a surface by a plurality of attachment members.

14. The pocket device as claimed in claim 10, wherein said upper channel opening sizing means comprises a top plate secured to the upper edges of said front and side portions forming a ledge and defining the size and shape of said upper channel opening.

15. The pocket device as claimed in claim 14, wherein said upper channel opening has a substantially square cross-section coaligned with said U-channel cross-section.

16. The pocket device as chimed in claim 14, wherein said upper channel opening has a partially semi-circular cross-section having a diameter substantially equal to the width dimension of said U-channel cross-section.

17. In a stake holder having a housing formed by a front panel and a pair of side panels interconnected to define a U-channel to form a pocket for receiving a stake therewithin, the improvement comprising:

means for removably attaching said housing to a surface to form a back panel in combination therewith;

means for defining the size and shape of the upper opening of said U-channel pocket; and means disposed at the lower opening of said U-channel pocket to prevent passage of said stake therethrough while permitting fluid flow through said pocket including ledge members disposed at diagonally opposite corners of said U-channel restricting the size of said lower opening to less than the cross-section of said U-channel to form a seat for receiving said stake when positioned within said U-channel.

18. The improvement of claim 17, wherein said upper channel opening is defined by a top plate forming a ledge at the upper edge of said pocket.

19. The improvement of claim 18, wherein said upper channel opening is coaligned with said U-channel.

20. The improvement of claim 17, wherein said ledge members are disposed at opposite corners of said U-channel and are sized and shaped to form an elliptically-shaped lower channel opening.

21. The improvement of claim 17, wherein said holder further includes a lip member projecting below the lower edge of said front panel.

22. A stake holder having a pocket adapted for mounting an elongated stake of substantially square or circular cross-section to a frame, said stake holder comprising:

a housing having a front member and a pair of side members having front and back edges, said front member being interconnected along said side member front edges to define a U-channel of substantially square cross-section to form said pocket and having an open back side, an upper channel opening and a lower channel opening;

a pair of flanges disposed along the back edges of said side members and including means to enable removable mounting of said flanges and said housing against a surface to close said open back side; and a pair of ledge members disposed at diagonally opposite corners of said lower channel opening to prevent the passage of said stake therethrough by providing a seat for said stake when positioned in said pocket and restricting the size dimension of said lower channel opening while permitting fluid flow through said channel.

\* \* \* \* \*